United States Patent [19]

Shapiro

[11] Patent Number: 4,506,502
[45] Date of Patent: Mar. 26, 1985

[54] GAS TURBINE ENGINES

[75] Inventor: Jacov Shapiro, Jerusalem, Israel

[73] Assignee: Beit Shemesh Engines Ltd., Mobile Post Haela, Israel

[21] Appl. No.: 544,803

[22] Filed: Oct. 24, 1983

Related U.S. Application Data

[63] Continuation of Ser. No. 222,945, Jan. 6, 1981.

[30] Foreign Application Priority Data

Jan. 20, 1980 [IL] Israel .......................................... 59170

[51] Int. Cl.$^3$ .............................................. F02C 7/10
[52] U.S. Cl. .................................. 60/39.43; 60/39.511
[58] Field of Search ........................ 60/39.51 R, 39.43; 415/77, 79; 416/197 R; 165/165, 166

[56] References Cited

U.S. PATENT DOCUMENTS

| | | | |
|---|---|---|---|
| 2,360,739 | 10/1944 | Strom | 165/165 |
| 2,721,445 | 10/1955 | Gilberty | 60/39.51 R |
| 3,575,528 | 4/1971 | Beam | 416/97 R |
| 3,818,695 | 6/1974 | Rylewski | 415/79 |
| 3,889,744 | 6/1975 | Hill et al. | 165/165 |

FOREIGN PATENT DOCUMENTS 604114  6/1948  United Kingdom ........... 60/39.51 R Primary Examiner—Louis J. Casaregola
Attorney, Agent, or Firm—Norbert P. Holler

[57] ABSTRACT

There is provided a high efficiency, medium output gas turbine engine which comprises at most three compressor stages, including one centrifugal compressor stage, all mounted on a common shaft for compressing inlet air, a combustion chamber for burning fuel in mixture with the compressed air to provide hot gases, output-power generating means operated responsive to the hot gases, an axial compressor-turbine driven by the hot gases exiting from the combustion chamber for driving an axial compressor integral with the axial compressor-turbine and constituting the final compressor stage, and a heat exchanger intercalated between the integral axial compressor/axial compressor-turbine unit and the output-power generating means. The heat exchanger is arranged to transfer heat from the hot gases leaving the axial compressor-turbine to the compressed air leaving the axial compressor. This abstract is not to be taken either as a complete exposition or as a limitation of the present invention, however, the full nature and extent of the invention being discernible only by referrence to and from the entire disclosure.

4 Claims, 8 Drawing Figures

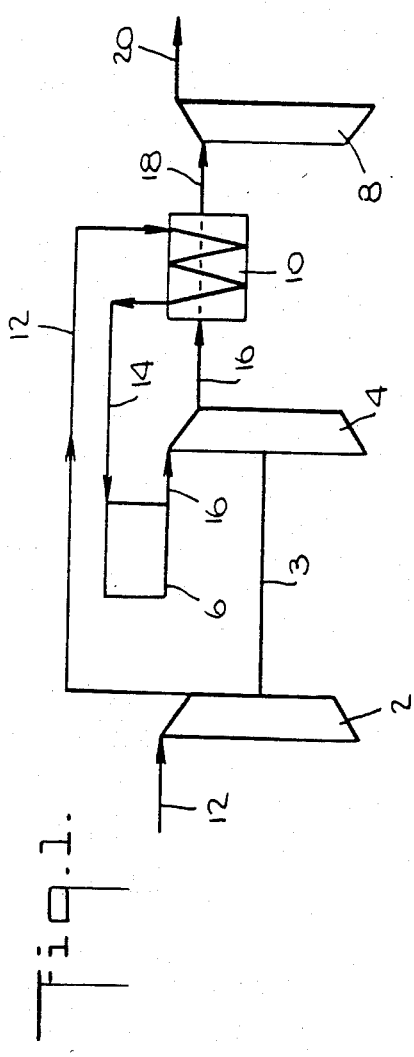
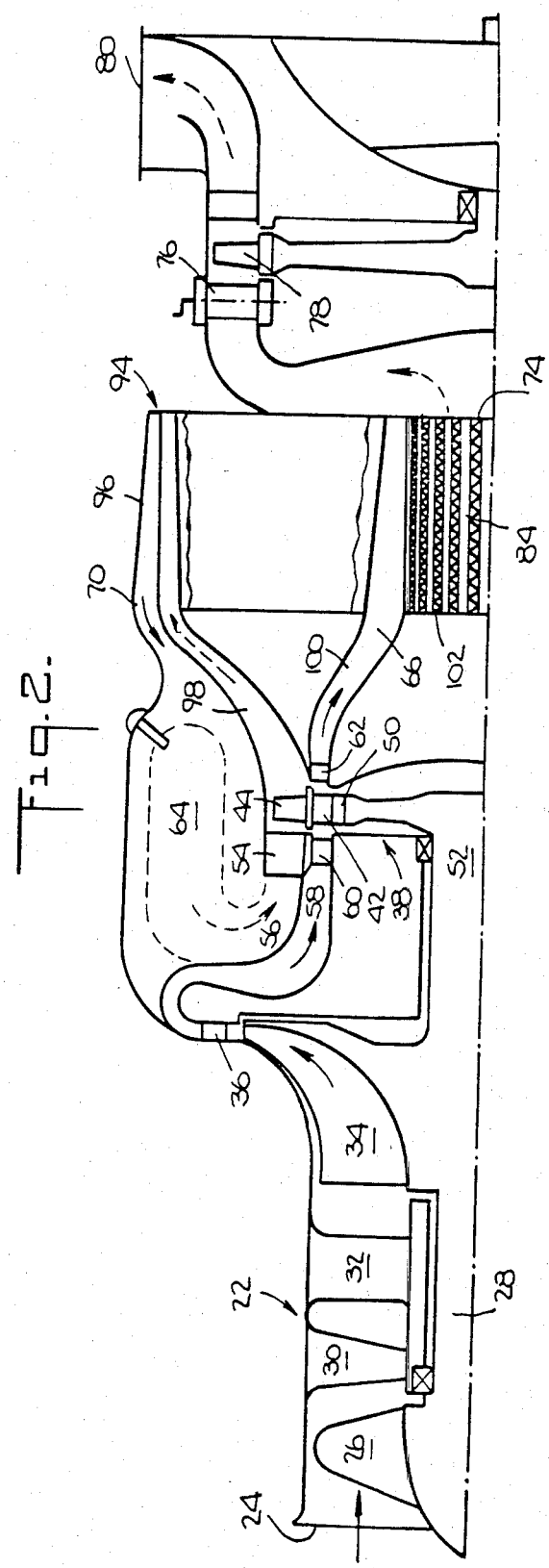
Fig.1.
Fig.2.

GAS TURBINE ENGINES

This application is a continuation of application Ser. No. 222,945 filed Jan. 6, 1981.

The present invention relates to gas turbine engines and more particularly to compact high-efficiency, medium output gas turbine engines using heat exchangers.

Gas turbine engines conventionally comprise a compressor for pressurizing inlet air to support combustion of fuel in the generation of a hot gas stream. The energy in this hot gas stream is used to drive the compressor via turbine means and to obtain propulsive power or to generate shaft output power from said turbine means, or from an additional power turbine means.

Efforts to obtain higher operating efficiencies and/or power outputs have concentrated on increasing the gas-stream temperature and/or on the utilization of a heat exchanger, situated downstream of the power turbine, in order to transfer waste-heat energy remaining in the exhaust gases to preheat the compressed air before combustion.

The gas-stream temperature is limited by the physical capabilities of the materials used for the turbine blades. This is especially true when one considers the high stresses imposed on the turbine rotor. This limitation had led to many proposed cooling systems for the turbine, particularly for those portions thereof exposed to the high-temperature gas stream. One such proposal is that part of the relatively cool air derived from the compressor be directed to the turbine to provide a cooling effect for lowering the temperature of the turbine blades to a level at which the material has sufficient strength to withstand the imposed stresses. The effectiveness of this solution is limited by the relatively large amount of work which must be done on the cooling air in order to deliver it to the turbine rotor, which is rotating at high speed. Moreover, the air used for cooling in the past did not go to the combustion chamber and, therefore, did not take part in the power-generation process and its energy was substantially lost.

Conventional utilization of heat exchangers in gas turbine engines requires the transport of the compressed air or of the exhaust gases from one end of the gas turbine engine to the other end and back again. For example, compressed air is taken from the compressor outlet near the inlet end of the gas turbine engine to the heat exchanger which is located at the outlet of the power turbine and is returned to the air inlet of the combustion chamber. This movement of air or gas requires an increased diameter of the gas turbine engine and much additional ductwork for air or gas transport. Moreover, as the compression ratio increases, the temperature of the compressed air also rises, limiting or impairing the effectiveness of the heat exchange. In addition, since the specific volume of the gas at the exhaust of the gas turbine engine is relatively high, very large heat exchangers are required to avoid excessive pressure drops.

The above limitations have restricted the use of gas turbine engines with heat exchangers.

It is an object of the present invention to provide new and improved gas turbine engines in which the above referred to disadvantages and limitations are substantially reduced or overcome.

According to the present invention, there is, therefore, provided a medium output gas turbine engine, comprising compressor means for compressing inlet air, said compressor means comprising at most three compressor stages, including one centrifugal compressor stage, all mounted on a common shaft, at least the final one of said stages being constituted by an axial compressor portion of an integral axial compressor/axial compressor-turbine unit, combustion means for burning fuel in mixture with said compressed air to provide hot gases, output-power generating means operated responsive to said hot gases, the axial compressor-turbine portion of said integral axial compressor/axial compressor-turbine unit being driven by said hot gases for driving said compressor means, and heat exchanger means intercalated between said integral axial compressor/axial compressor-turbine unit and said output-power generating means, said heat exchanger means being arranged to transfer heat from the hot gases leaving said axial compressor-turbine portion to the compressed air passing from said axial compressor portion to said combustion means.

The term power generating means, as used herein, includes such devices as a power turbine for the generation of shaft output power or a jet exhaust for the generation of thrust, or a combination thereof.

It is to be understood that the intercalation of said heat exchanger means between the integral axial compressor/axial compressor-turbine unit and the output-power generating means is not necessarily a physical, coaxial or linear interposition, the only necessary arrangement being that the hot gases leaving the compressor-turbine portion of the unit pass through the heat exchanger before reaching the output-power generating means.

Ducting and tubing are minimized, in fact no external ducting and tubing are required, and hence the overall size of the gas turbine engine is reduced by placing the heat exchanger immediately after the compressor turbine and the final compressor stage. In addition, several other synergistic advantages are immediately secured.

The gas exiting from the axial compressor-turbine portion of the integral axial compressor/axial compressor-turbine unit is substantially hotter than the air exiting from the axial compressor portion. Thus, even at such high compression ratios as 10 to 15 and correspondingly high compressed air temperatures, the heat exchanger of the present invention provides for efficient heat exchange.

Additionally, the specific volume of the hot gas at the compressor turbine output is considerably lower than that at the exhaust of the gas turbine engine, so that locating the heat exchanger according to the present invention results in a substantially smaller heat exchanger than in conventional gas turbine engines. Moreover, the gas pressure at the exit of the axial compressor-turbine portion of the unit is high, compared to that at the gas turbine engine exhaust. Therefore, larger pressure drops can be tolerated in the heat exchanger of the present invention than in those of conventional gas turbine engines, without lowering the power-turbine output which is dependent on the ratio of the pressure drop to the absolute pressure.

Placing the heat exchanger upstream of the power turbine, and the consequent lower gas temperature at the inlet to the power turbine, permit the use of variable-geometry turbine nozzles in the power turbine for improving the efficiency of the gas turbine engine at partial loads.

It should be noted that, although this concept of heat exchanger location will favorably affect the performance of any medium output gas turbine engine, its full advantage is best brought out in conjunction with the aforesaid feature of the present invention, namely that the axial compressor stage is combined with the axial compressor-turbine into an integral axial compressor-/axial compressor-turbine unit having double-decked blades mounted on a single disk. Each of the double-decked blades comprises, in radial juxtaposition, a blade of the axial compressor and, above it, a blade of the axial turbine. Means are provided for keeping the hot gases and compressed air substantially separate. Furthermore, cooling conduits are provided within the axial turbine blades for the passage of a portion of the compressed air through the turbine blades.

This integral unit thus provides for cooling of the compressor, turbine blades and disk, while avoiding most of the losses of the prior art.

The combination of the integral unit with the heat exchanger location of the present invention further reduces the ductwork needed due to the interior flow thus facilitated.

The present invention can be utilized in various gas turbine engine types, such as, turboshaft, turboprop, turbojet, etc. The many uses include mechanical shaft power generation and aircraft propulsion, including helicopter propulsion. The gas turbine engine of the present invention is available with high compression ratios of 6 and above. An important feature of the present invention is that the exhaust gases are at a lower temperature than for conventional gas turbine engines, even with heat exchangers.

It is advantageous to use a partial-admission axial turbine in the integral axial compressor/axial compressor-turbine unit for the added cooling effect afforded by the so reduced circumference impacted by the hot gases at each revolution of the turbine blade array. It should also be noted that substantial precompression as facilitated by the centrifugal compressor stage upstream of the integral axial compressor/axial compressor-turbine unit reduces the gas-air pressure differences, thereby simplifying sealing problems.

While the invention will now be described in connection with certain preferred embodiments with reference to the following illustrative figures so that it may be more fully understood, it is, however, stressed that the particulars shown and described are by way of example and for purposes of illustrative discussion only and are presented in the cause of providing what is believed to be the most useful and readily understood description of the principles and conceptual aspects of the invention. In this regard no attempt is made to show structural details of the devices and their elements in more detail than is necessary for a fundamental understanding of the invention, the description taken with the drawings making apparent to those skilled in the art how the several forms of the invention may be embodied in practice.

In the drawings:

FIG. 1 is a diagrammatic layout of the gas turbine engine according to the present invention;

FIG. 2 is a schematic representation of a preferred embodiment of the present invention;

Figure 3:
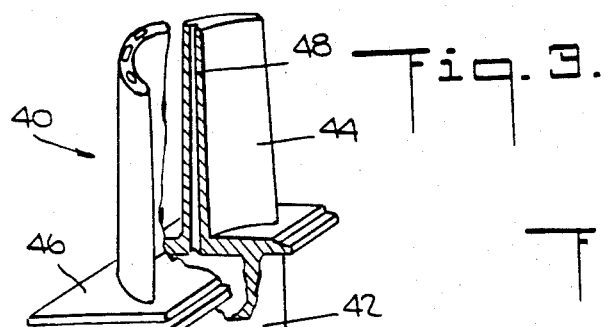
FIG. 3 is a perspective view, partially sectioned, of a double-decked blade of the integral axial compressor-axial turbine unit.

There is shown in FIG. 1 a diagrammatic layout of a gas turbine engine according to the invention. Seen is a compressor 2 mechanically connected by a shaft 3 to a compressor turbine 4, a combustion chamber 6, a power turbine 8 and at least functionally, but preferably also physically, interposed between the latter and the compressor turbine 4, a heat exchanger 10. Inlet air 12 is drawn by compressor 2 from the outside and forced into heat exchanger 10 where it is heated and, as hot air 14, is led into combustion chamber 6. Here it sustains the combustion of the fuel, leaving the combustion chamber 6 as hot gas 16 which drives the compressor turbine 4 and is led into the heat exchanger 10, where part of its heat is transferred to the inlet air 12. It leaves the heat exchanger 10 at a much lower temperature as cooled gas 18, to impinge on, and drive, power turbine 8, which it exits as exhaust gas 20.

The advantages of the turbine engine according to the invention, in which the heat exchanger is intercalated between the compressor turbine and the power turbine are, however, still enhanced in a preferred embodiment of the present invention (FIG. 2) in which, as already mentioned, an axial compressor stage is combined with the compressor turbine to form an integral axial compressor-axial turbine unit.

There is seen in FIG. 2 a gas-turbine engine comprising an axial compressor 22 including air inlet 24 and compressor blades 26 mounted on compressor shaft 28, followed by diffuser blades 30 and 32. A second compressor stage employing a centrifugal compressor 34 followed by radial diffuser 36 is also mounted on the compressor shaft 28 following the axial compressor 22.

An integral axial compressor-axial turbine unit 38 comprises a row of double-decked blades 40 (see FIG. 3) each comprising a compressor blade 42 and above it a turbine blade 44 in radial juxtaposition and separated by a shelf portion 46. Interior cooling conduits 48 are formed within the turbine blade 44 and extend through said shelf portion 46.

The double-decked blades 40 are further provided with mounting means 50 for mounting the double-decked blades 40 on to disk 52 which is fixed to compressor shaft 28. The disk 52 of this integral unit is thus provided with two concentric sets or arrays of blades 42 and 44, respectively, each of which arrays may, but need not necessarily, consist of an equal number of blades. It is also possible to prepare the disk 52 and the arrays of blades 42 and 44 as one integral whole, e.g., by casting.

The set of turbine blades 44 together with turbine nozzles 54 are thus seen to comprise an axial compressor-turbine portion 56 while the compressor blades 42 together with inlet guide vanes 60 and outlet stator 62 comprise an axial compressor portion 58.

The inlet to the compressor portion 58 communicates with the outlet of the centrifugal compressor 34, while the inlet of the compressor-turbine portion 56 communicates with the outlet of combustion chamber 64.

The outlet of the compressor portion 58 is joined to compressed-air inlet 66 of heat exchanger 68 whose pre-heated compressed-air outlet 70 leads to combustion chamber 64. Hot-gas inlet 72 and cooled-gas outlet 74 of the heat exchanger 68 communicate respectively with the outlet of turbine portion 56 and with variable-geometry turbine nozzles 76 of the power turbine 78. The outlet 80 of the power turbine 78 constitutes the exhaust of the gas turbine engine.

Figure 7:
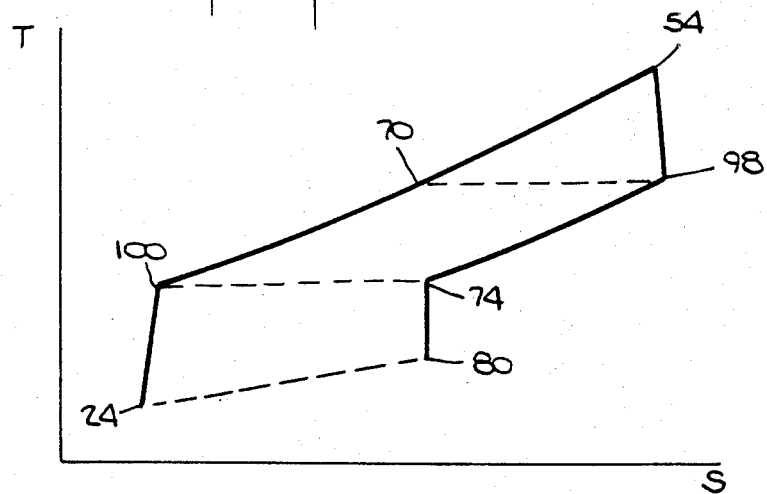
FIG. 7 is a T-S (temperature-entropy) diagram of the gas turbine engine of FIG. 2.

The operation of this gas turbine engine can be better understood with the aid of the T-S diagram of FIG. 7, wherein the reference numbers on the diagram refer to corresponding items in FIG. 2. This preferred embodiment operates on a modified Brayton cycle differing from the conventional Brayton cycle in that part of the energy normally supplied to the compressed air by fuel combustion is supplied by heat transfer from the hot gases after these hot gases have driven the compressor turbine. It differs from the conventional regeneration Brayton cycle in that this heat is supplied from hot gases prior to driving the power turbine rather than from the exhaust gases of the power turbine. It should be noted that both air and gas operate on the same thermodynamic cycle.

In operation, air (indicated by solid arrows) enters the gas turbine engine at air inlet 24, is compressed by compressors 22 and 34, and the axial compressor portion 58 of the integral axial compressor-axial turbine unit 38. The compressed air enters the heat exchanger 68 directly at compressed-air inlet 66, wherein heat energy is transferred to the compressed air from hot gases as described below. The preheated compressed air exits the heat exchanger 68 at heated-air outlet 70 and enters combustion chamber 64. A combustion process at substantially constant pressure in combustion chamber 64 adds energy to the air, which exits the combustion chamber 64 together with the combustion products as a hot gas stream (indicated by dashed arrows). The hot gases enter the axial turbine portion 56 of the integral unit 38 via turbine nozzles 54. This hot gas stream impacts blades 44 to drive the compressor shaft 28 and, consequently, compressors 26 and 34, as well as the axial compressor set of blades 42 of the integral unit 38.

The hot gases entering the axial turbine portion 56 are very hot, the temperature limit being set by the materials used in the blades. However, this temperature limit can be raised by the construction shown in FIG. 3, wherein the compressed air cools the blades 42 by convection and, subsequently, the blades 44 by conduction. Also, a small portion of the air that is compressed by compressor blades 42 is forced through conduits 48 in the turbine blades 44, to further cool blades 44 by convection. The cooling air which exits the conduits at the end of the turbine blades 44 joins the hot gas stream.

While the hot gas temperature is reduced during its passage through the turbine portion 56, it is, nevertheless, still relatively high. For example, the temperature may be reduced from a turbine inlet gas temperature of approximately 1200° C. to approximately 850° C. The hot gas at this temperature and at a pressure of, for example, approximately 3 bar directly enters the heat exchanger via hot gas inlet 72, wherein heat energy $Q_R$ is transferred to the compressed air as indicated above. This heat exchange takes place nearly at a constant pressure and in the counterflow mode.

The construction of the integral unit 38 shown in FIG. 2 is particularly advantageous, because it allows for the flow of hot gases and compressed air in the same direction, facilitating the direct admission of hot gases and compressed air to the heat exchanger 68.

The cooled gases, which leave the heat exchanger 68 via cooled-gas outlet 74, enter the power turbine 78 via the variable-geometry turbine nozzles 76. These turbine nozzles allow for optimal adjustment of the operating point of the power turbine 78 for varying loads. Due to the lowered gas temperature, the variable-geometry turbine nozzles can be constructed by known means. The exhaust gases exit the gas turbine engine at exit 80 at atmospheric pressure and low infra-red temperature. It is a particular feature of the invention that lower exhaust-gas temperatures can be achieved than those of conventional engines.

Figure 4:
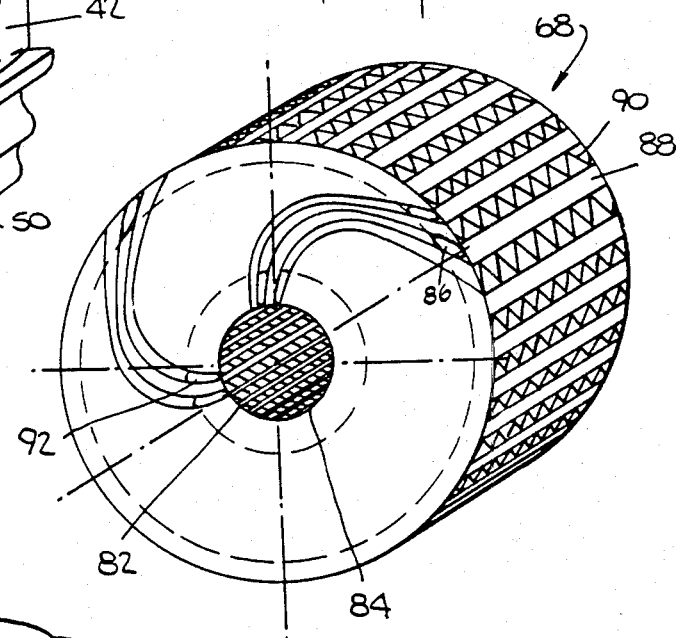
FIG. 4 is a perspective view of a cylindrical, spiral-duct counterflow heat exchanger.
Figure 5:
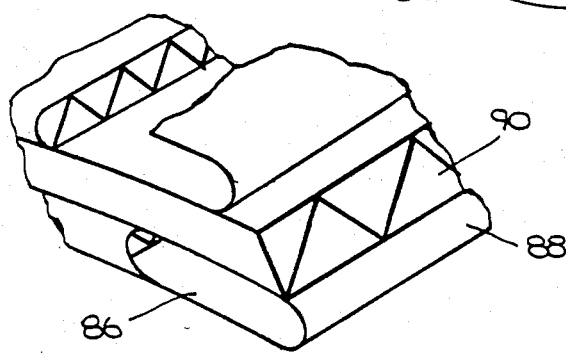
FIG. 5 is a detail of the heat exchanger of FIG. 4.
Figure 6:
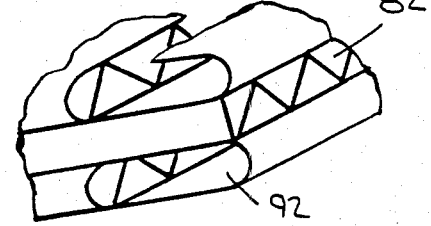
FIG. 6 is another detail of the heat exchanger of FIG. 4.

The cylindrically shaped heat exchanger 68 shown in FIG. 4, which may be made of ceramic, stainless steel or other suitable material or combinations of materials, comprises a plurality of alternating spiral conduits of two types. A first type has a first opening 82 along a central bore portion 84 and another opening 86 along a side wall near the outer periphery of the heat exchanger, as shown in detail in FIGS. 5 and 6. The outer peripheral walls 88 of these conduits are closed, as are the side walls, except for opening 86. The second conduit type has an opening 90 along its outer peripheral wall and a second opening 92 along the side wall near the bore 84. The inner peripheral surfaces of these conduits are closed.

It is clearly seen that this heat exchanger meets the requirements previously referred to when, for example, hot gases enter via openings 86 and exit via openings 82, and relatively cooler compressed air enters via openings 92 and exits via openings 90. The cross-sectional area of the conduits increases with the radius, so that the hot gases which enter via openings 86 and exit at the central bore 84 are reduced in specific volume while they are cooled, thus keeping the velocity of the gas relatively constant. Conversely, the compressed air enters via openings 92 and exits via openings 90, expands as it is heated and flows through the heat exchanger, with the cross-sectional area of the conduits increasing, keeping its velocity relatively constant.

A method of mounting the heat exchanger 68 in the gas turbine engine is seen in FIG. 2. Heat exchanger housing 94 comprises an outer cylindrical shell 96 and annular ducts 98 and 100 together with plate 102 provides means for isolating the openings 82, 86, 90 and 92 from each other, while at the same time providing means for connecting the openings with respective parts of the combustion chamber 64, axial compressor-axial turbine unit 38 and the power turbine 78. As shown in FIGS. 2 and 4, the housing 94 connects outlet 90 with the combustion chamber 64 via pre-heated compressed-air outlet 70, outlets 82 with turbine means 78 via cooled-gas outlet 74, while inlets 86 and 92 are connected with the outlets of compressor-turbine portion 56 and compressor portion 58 via inlet 72 and 66, respectively.

It should be noted that since the heat exchanger 68 is placed in a relatively high pressure region of the hot gas stream, a relatively high absolute pressure drop can be tolerated without unacceptable loss of efficiency. This is in contrast with the conventional placement of heat exchangers in gas turbines, with a resultant low tolerance for pressure drops.

The heat-exchanger placement in the present invention is suitable for higher compression engines, since even for compression ratios of 10 to 15, the temperature differential between the gases exiting from the axial turbine portion and the compressed air exiting from the axial compressor portion is still high, allowing for substantial and efficient heat exchange.

Keeping these points in mind, it becomes clear that the heat exchanger here presented can be of a considerably smaller size than the conventional heat exchangers. Calculations show that utilizing this preferred embodiment of the present invention, e.g., a 650 HP turboshaft engine, such as, that used on small helicopters, would allow for an increase of compressor-turbine inlet gas temperature from 1050° C. to 1200° C. and an increase in compression ratio from 6 to 11, while reducing specific fuel consumption from 0.265 kg per HPhr. to 0.165 kg per HPhr. At the same time, the weight of the engine is only slightly increased. Calculations show that the volume of the heat exchanger is 40 liter and its weight is less than 30 kg, if made of ceramic.

Figure 8:
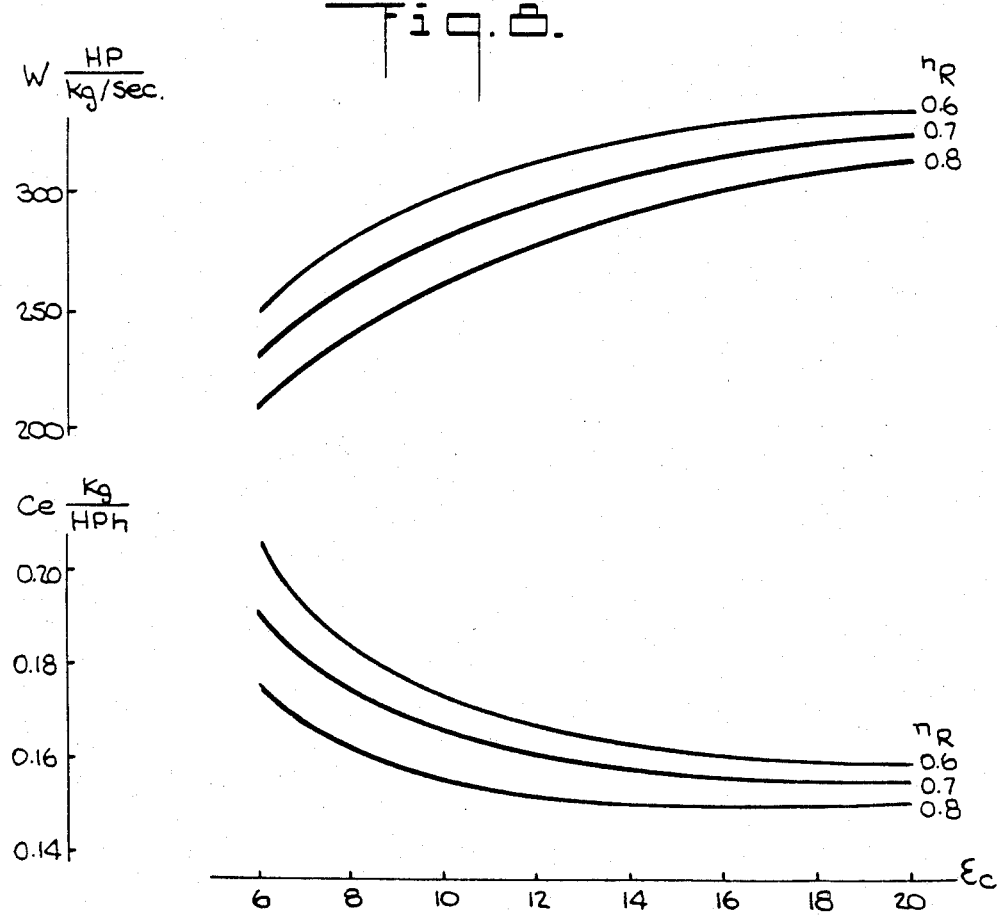
FIG. 8 shows specific power and specific fuel consumption W and $C_e$ for a gas turbine engine of the present invention as a function of compression ratio $\epsilon_c$ and for a range of heat exchanger efficiencies $\eta_R$.

FIG. 8 graphically shows calculated specific fuel consumption $C_e$ and specific power W as a function of compression ratio $\epsilon_c$, for a range of heat-exchanger efficiencies $\eta_R$. The results are calculated at a compressor-turbine inlet gas temperature ($T_{54}$) of 1200° C., compressor efficiency ($\eta_c$) of 0.8, compressor-turbine efficiency ($\eta_T$) of 0.85, power-turbine efficiency ($\eta_L$) of 0.9, and relative pressure drop $\Delta P/P$ in the heat exchanger equal to 0.04. Optimum efficiencies are seen to occur for compression ratios of between 10 to 15.

While particular embodiments of the invention have been described, it will be evident to those skilled in the art that the present invention may be embodied in other specific forms without departing from the essential characteristics thereof. For instance, the front axial compressor 22 may be altogether eliminated, or the centrifugal compressor 34 may constitute the front compressor, with a second axial compressor stage located downstream of the centrifugal compressor. The present embodiments are, therefore, to be considered in all respects as illustrative and not restrictive, the scope of the invention being indicated by the appended claims rather than by the foregoing description, and all changes which come within the meaning and range of equivalency of the claims are, therefore, intended to be embraced therein.

What is claimed is:

1. A compact, medium output gas turbine engine, comprising compressor means for compressing inlet air, said compressor means comprising at most three stages, including one centrifugal-type compressor stage, all mounted on a common shaft, at least the final one of said stages being constituted by an axial compressor portion of an integral axial compressor/axial compressor-turbine unit including a turbine disk carrying a row of blades in the form of two concentric arrays of blades the inner array of which constitutes said axial compressor portion and the outer array of which constitutes an axial compressor-turbine portion of said integral axial compressor/axial compressor-turbine unit, combustion means for burning fuel in mixture with the compressed air produced by said compressor means to provide hot gases, output-power generating means located downstream of said combustion means and operated responsive to said hot gases, first means for directing said hot gases from said combustion means to said axial compressor-turbine portion of said integral axial compressor/axial compressor-turbine unit for driving the same and therethrough said axial compressor portion of said integral axial compressor/axial compressor-turbine unit and therewith the preceding stage or stages of said compressor means, second means for directing the compressed air which is produced by said preceding stage or stages of said compressor means to said final stage thereof prior to mixing of that compressed air with fuel, for thereby cooling said row of blades of said integral axial compressor/axial compressor-turbine unit, both said first and second directing means being constructed and arranged for guiding the compressed air and said hot gases to flow solely in the interior of the engine and in the same direction through said integral axial compressor/axial compressor-turbine unit, and heat exchanger means intercalated between said integral axial compressor/axial compressor-turbine unit and said output-power generating means, said integral axial compressor/axial compressor-turbine unit being arranged for direct flow of said compressed air and said hot gases from the respective portions of said unit into said heat exchanger means, said heat exchanger means serving for transferring heat from said hot gases to said compressed air as said hot gases leave said axial compressor-turbine portion of said integral axial compressor/axial compressor-turbine unit and flow therefrom to said output-power generating means and as said compressed air leaves said axial compressor portion of said integral axial compressor/axial compressor-turbine unit and flows therefrom to said combustion means.

2. The gas turbine engine as claimed in claim 1, wherein said output-power generating means comprises a power turbine.

3. The gas turbine engine as claimed in claim 1, wherein said outer array of blades is constructed and arranged to constitute a partial-admission turbine unit.

4. The gas turbine engine as claimed in claim 1, wherein said heat exchanger means is a counterflow heat exchanger having a cylindrical shape comprising a plurality of thermally contacting, spirally curved, alternating first and second conduits, wherein each of said first conduits has an opening at one end into a central bore portion of said heat exchanger and another opening near the other end of said first conduit at an outer peripheral edge of a side wall of said heat exchanger, and each of said second conduits has an opening at one end along the outer peripheral surface of said heat exchanger and a second opening at said side wall near said central bore portion.

* * * * *